UNITED STATES PATENT OFFICE.

JOHN COOKERLEY, OF INGLENOOK, ALABAMA, ASSIGNOR OF EIGHTY ONE-HUNDREDTHS TO ED SHELTON, OF BIRMINGHAM, ALABAMA.

PROCESS FOR THE MELTING OF METALS WHICH FUSE AT HIGH TEMPERATURES IN IRON OR STEEL LADLES.

1,208,717.  Specification of Letters Patent.  Patented Dec. 12, 1916.

No Drawing.  Application filed February 21, 1916.  Serial No. 79,531.

*To all whom it may concern:*

Be it known that I, JOHN COOKERLEY, a citizen of the United States of America, residing at Inglenook, in the county of Jefferson and State of Alabama, have invented certain new and useful Improvements in Processes for the Melting of Metals Which Fuse at High Temperatures in Iron or Steel Ladles, of which the following is a specification.

My invention relates to a new and useful process whereby I am enabled to melt and pour metals such as copper, brass, bronze and the like in a simple and quick manner and without requiring the use of expensive crucibles and the large consumption of fuel as is now the practice.

The discovery of my present process results from efforts to simplify the manner of melting copper, bronze or brass, my object being to accomplish this in an iron or steel ladle and with the use of any convenient means such as an open blacksmith forge or the like. As is well known the fusing point of copper is so high that it has been impractical to use wrought steel or wrought iron ladles in which to melt it because the latter are liable to give down under the weight of the copper when heated to a point that will melt the copper, hence it has been necessary to melt such metals in expensive graphite crucibles and with an elaborate heating plant.

By my process, I first melt down a small quantity of chlorid of sodium, or common salt, in an iron or steel ladle, and cause this molten solution to be spread over the inner surface of the ladle. In the ladle as thus treated and while the small quantity of sodium chlorid remains in molten condition therein, I introduce the copper and heat the ladle or crucible to a white heat and I find that in a few minutes I can melt down the copper and the ladle or crucible itself will be unaffected thereby and can be used for pouring the molten metal. If desired the ladle or crucible can be treated on its outer surface by being brought to a white hot heat and having salt spread over the outside surface thereof which is again subjected to heat so that the outer surface receives a treatment with the molten sodium chlorid.

In my experiments I have found that the amount of sodium chlorid used for melting copper has been roughly in the proportion of about a tablespoon of salt to about four pounds of copper, and using the salt in the manner described, I have melted copper in an open ladle over a blacksmith's forge in from three to five minutes, whereas the time required for melting copper in accordance with the present practice is about one and one half to two hours.

Another feature of my invention relates to the manner of the treatment of iron and steel with the melted sodium chlorid to increase the resistance thereof to heat and in this conection I have found that the immersing of a blast furnace picking rod or tapping bar in molten sodium chlorid will so greatly raise its capacity to resist heat that it materially increases its durability under the conditions of excessive heat in which it is used. In practice I have immersed steel bars of the same size and quality in molten iron, part only of the bars having been previously treated with the chlorid of sodium, and I find that the treated bars show a resistance to the heat approximately of three to one to the untreated bars as in a given length of time they were only reduced about one-third in size, whereas the others were entirely melted. In like manner, after treating the picking and tapping bars I have found that I could handle three or four heats of the furnace with two bars, whereas in ordinary practice the handling of that many heats would require from eight to eighteen bars. In treating these bars, I first melted the sodium chlorid in a tube or pipe and then brought the bar to a red heat and immersed it for twenty minutes in the molten solution of sodium chlorid while the latter was exposed to heat to maintain it in molten condition. I prefer to withdraw the bar after this treatment and after letting it partly cool I bring it up to temperature again and introduce it for a second bath after which I have found that its heat resisting qualifications are so greatly increased that I can obtain from it the results above stated.

One advantage of my process as applied to the treatment of ladles for the melting of copper, brass or bronze, is that the molten bath of sodium chlorid will prevent the molten metal sticking to the ladle. Moreover the melted sodium chlorid will be sure to treat the entire surface of the ladle which is exposed to the metal because, being of lighter specific gravity than the copper, it will float on the latter and thus move ahead of it up along the surface of the ladle and treat the latter in advance of the rising volume of molten metal.

While my invention primarily relates to the improvement in the method of melting copper, the fact that I am enabled to increase the heat resisting qualities of metals, such as iron and steel, is also a part of my present invention and I desire to claim same as applied to ladles and otherwise.

Having thus described my invention, what I claim as new and desire to secure by Letters Patent, is:—

1. The hereindescribed process for the melting of copper, bronze and cuprous metals having a high melting point, which consists in melting the cuprous metal in an iron or steel crucible in the presence of a bath of melted sodium chlorid.

2. The hereindescribed process for the melting of copper, bronze, and cuprous metals having a high melting point in iron or steel ladles or crucibles, which consists in introducing sufficient sodium chlorid into the ladle or crucible to form, when melted, a bath therein, causing this bath of molten sodium chlorid to contact with the inner surface of the ladle or crucible to treat the latter, then introducing the copper, brass, bronze and the like into the ladle or crucible with the sodium chlorid bath therein, and bringing the ladle or crucible to a white hot temperature.

3. The hereindescribed process for the melting of cuprous metals in iron or steel ladles, which consists in treating an iron or steel ladle prior to exposing it to a temperature capable of melting its cuprous contents, with a bath of sodium chlorid.

In testimony whereof I affix my signature.

JOHN COOKERLEY.

Witness:
NOMIE WELSH.

Copies of this patent may be obtained for five cents each, by addressing the "Commissioner of Patents, Washington, D. C."